United States Patent
Zaccheo (12)

(10) Patent No.: US 7,010,018 B2
(45) Date of Patent: Mar. 7, 2006

(54) FAST ACQUISITION PROCEDURE FOR TDD W-CDMA

(75) Inventor: Luca Zaccheo, Leuven (BE)

(73) Assignee: Agilent Technologies, Inc., Palo Alto, CA (US)

( * ) Notice: Subject to any disclaimer, the term of this patent is extended or adjusted under 35 U.S.C. 154(b) by 286 days.

(21) Appl. No.: 10/603,275

(22) Filed: Jun. 25, 2003

(65) Prior Publication Data

US 2005/0018757 A1    Jan. 27, 2005

(51) Int. Cl.
*H04K 1/00* (2006.01)
(52) U.S. Cl. .................... 375/147; 375/149; 375/134
(58) Field of Classification Search ........... 375/147, 375/149, 152, 134, 343
See application file for complete search history.

(56) References Cited

U.S. PATENT DOCUMENTS

2004/0190605 A1 *  9/2004  Cresens .............. 375/152

* cited by examiner

*Primary Examiner*—Temesghen Ghebretinsae

(57) ABSTRACT

A method for the acquisition of burst synchronization signals in a spread spectrum communication system is provided. The method receives a burst synchronization signal, applies a dwelling procedure according to a scheduling scheme to the burst synchronization signal, wherein the dwelling procedure calculates a matched filter output, sums the outputs over one slot time, calculates the energy in the sum, searches the maximum energy value and passes it to a Random Access Memory. At the end of the scheduling scheme, searching is performed for the overall maximum energy value among the energy values stored in the Random Access Memory.

10 Claims, 6 Drawing Sheets

FAST ACQUISITION PROCEDURE FOR TDD W-CDMA

FIELD OF THE INVENTION

The present invention is related to a receiver structure for Direct Sequence spread-spectrum communication systems, allowing a fast acquisition of synchronisation signals.

DISCUSSION OF THE BACKGROUND ART

In cellular mobile communication systems Direct Sequence Code Division Multiple Access (DS-CDMA) is an often used technology. User data are modulated on different PN codes unique to each user channel and transmitted in slots. In the UTRA wideband-CDMA (W-CDMA) systems for example a frame consists of 15 slots. In a Frequency Division Duplexing (FDD) CDMA system different frequency bands are foreseen for uplink and downlink communication, whereas in a Time Division Duplexing (TDD) CDMA system the same frequencies are used for both uplink and downlink. Some time slots in the TDD system are used for downlink and some for uplink transmission.

For fast acquisition in TDD mode a downlink synchronisation channel (SCH) is transmitted by each base station. The SCH consists of two subchannels, the primary and the secondary SCH. The slot synchronisation is derived from the pSCH (Primary Synchronisation Channel). For terrestrial purposes, the SCH is located in only two slots of the frame structure. In each of the two slots there is an active part containing a PN code of a certain length and a part where no synchronisation signal is present. To find the pSCH, a matched filter is used. By 'matched filter' is meant a FIR filter matched to the PN code applied in the synchronisation slot. The matched filtering operation is equivalent to calculating a cross correlation between the received signal and the PN code sequence contained in the matched filter. When a correlation peak is found, one has to wait for the second peak occurring 7 or 8 slots later.

This procedure is fast but not robust for two main reasons. To find one of the two correlation peaks it is necessary to set a threshold and at least one of the correlation peaks (the two correlation peaks are relative to the two pSCH present in a frame) has to exceed the threshold. But if one or more noise peaks exceed the threshold or if the average noise is too high to be able to set a correct threshold, it is not possible to find the correct synchronisation without using a dwelling procedure. Secondly, to use the dwelling procedure, it is necessary to store in a RAM the matched filter output for the complete frame duration and then to look for the two maximum values. This means in TDD mode it is necessary to have a RAM 15 times bigger than in FDD mode, which makes this solution too hardware expensive.

Present invention is related to the subject matter of EP application no. 03250482.1 "Programmable Acquisition Module For Multi-standard CDMA Based Receiver", where a module is disclosed suitable for the acquisition of several kinds of codes.

The present invention aims to provide a flexible and robust procedure for a fast acquisition of the slot edges of TDD W-CDMA signals in burst mode.

SUMMARY OF THE INVENTION

The present invention is related to a method for the acquisition of burst synchronisation signals in a spread spectrum communication system, comprising the following steps:

1) Receiving a burst synchronisation signal,
2) Applying to said received burst synchronisation signal a dwelling procedure according to a scheduling scheme, whereby said dwelling procedure comprises the steps of calculating a matched filter output, summing said outputs over one slot time, calculating the energy in said sum, searching the maximum energy value and passing it to a Random Access Memory,
3) Based on said scheduling scheme containing a set of $X=(N+1)/2$ hypotheses, being numbered $0, 1, \ldots, X-1$ and N being the number of slots in 1 frame, the slots being numbered $0, 1, \ldots, N-1$, a dwelling procedure being performed in hypothesis $n=0, \ldots, X-2$ in slots n, n+N−D and n+D and in hypothesis $n=X-1$ in slots n and n+D, D being the longest distance in slots between two sync slots,
4) At the end of the scheduling scheme searching for the overall maximum energy value among the energy values stored in said Random Access Memory, whereby said scheduling scheme is built up in the following way:
(a) choosing any hypothesis from said set of hypotheses,
(b) performing dwelling procedure in the frame slots as indicated in the chosen hypothesis,
(c) leaving one slot open after the last dwelling procedure for said chosen hypothesis,
(d) choosing an hypothesis not used yet, having in the next available slot a dwelling procedure in that slot and not in the subsequent slot or having in the next available slot a dwelling procedure in that slot as well as in the subsequent,
(e) performing dwelling procedure in the frame slots as indicated in the chosen hypothesis,
(f) leaving one slot open after the last dwelling procedure for said hypothesis,
(g) repeating (d-f) until all hypotheses have been used, whereby in case there is no unused hypothesis that matches, the slot is left empty and the following slot is used.

In a specific embodiment steps (b) and (e) are repeated in the method described above.

In an alternative embodiment the steps of 'leaving one slot open after the last dwelling procedure for said hypothesis' are omitted in previously described embodiments.

In an advantageous embodiment the number of slots N is 15 and the longest distance (in slots) between two sync slots D equals 8.

In another embodiment of the invention a module for the acquisition of burst synchronisation signals comprises means for applying a method as described here.

Preferably such a module is comprised in an integrated circuit device.

Alternatively a receiver comprises such a module or an integrated circuit device as mentioned before.

In yet another embodiment a spread-spectrum communication apparatus comprises such a module or integrated circuit device.

DETAILED DESCRIPTION OF THE PREFFERED EMBODIMENT

Figure 1:
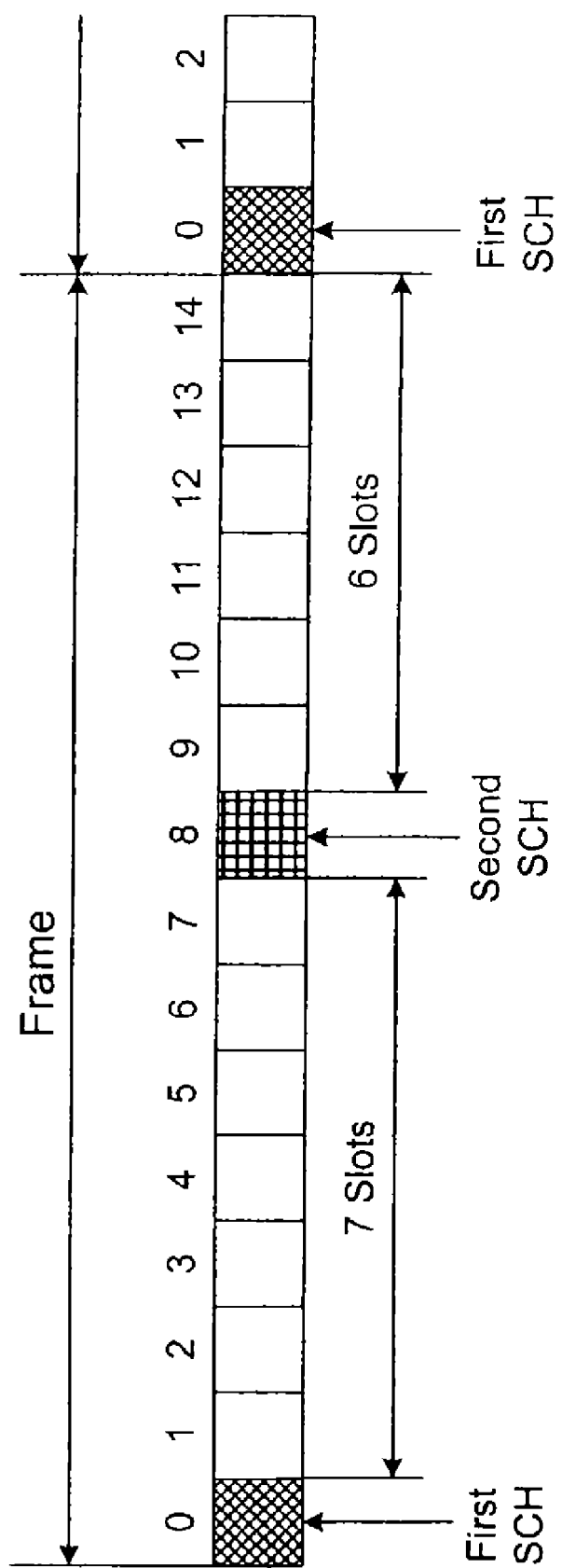
FIG. 1 represents the slot synchronisation in TDD mode.

The slot synchronisation is derived from the PSCH (Primary Synchronisation Channel) For terrestrial purposes, the SCH is located in only two slots of the frame structure as shown in FIG. 1. In the pSCH the same synchronisation signal is used in both slots.

The proposed solution for fast acquisition mainly comes down to the recursive application of a dwelling procedure with different shifts according to a particular scheduling scheme in order to reduce the acquisition time. The scheduling scheme indicates in which slots a dwelling procedure is performed. With 'different shifts' is meant that the position of the slots in which a dwelling procedure is done, is shifted, as to cover all possible cases.

The dwelling procedure is slot time based. The matched filter length equals the size of the PN code used in the synchronisation signal. The received signal is applied to the matched filter and the absolute values of the matched filter outputs are coherently summed in a RAM over one slot time. Then the energy contained in said sum is calculated. This is repeated several times for different slots before searching the maximum energy value. In this way it is possible to sum the correlation peaks that are present in different slots and to average the noise.

Figure 2:
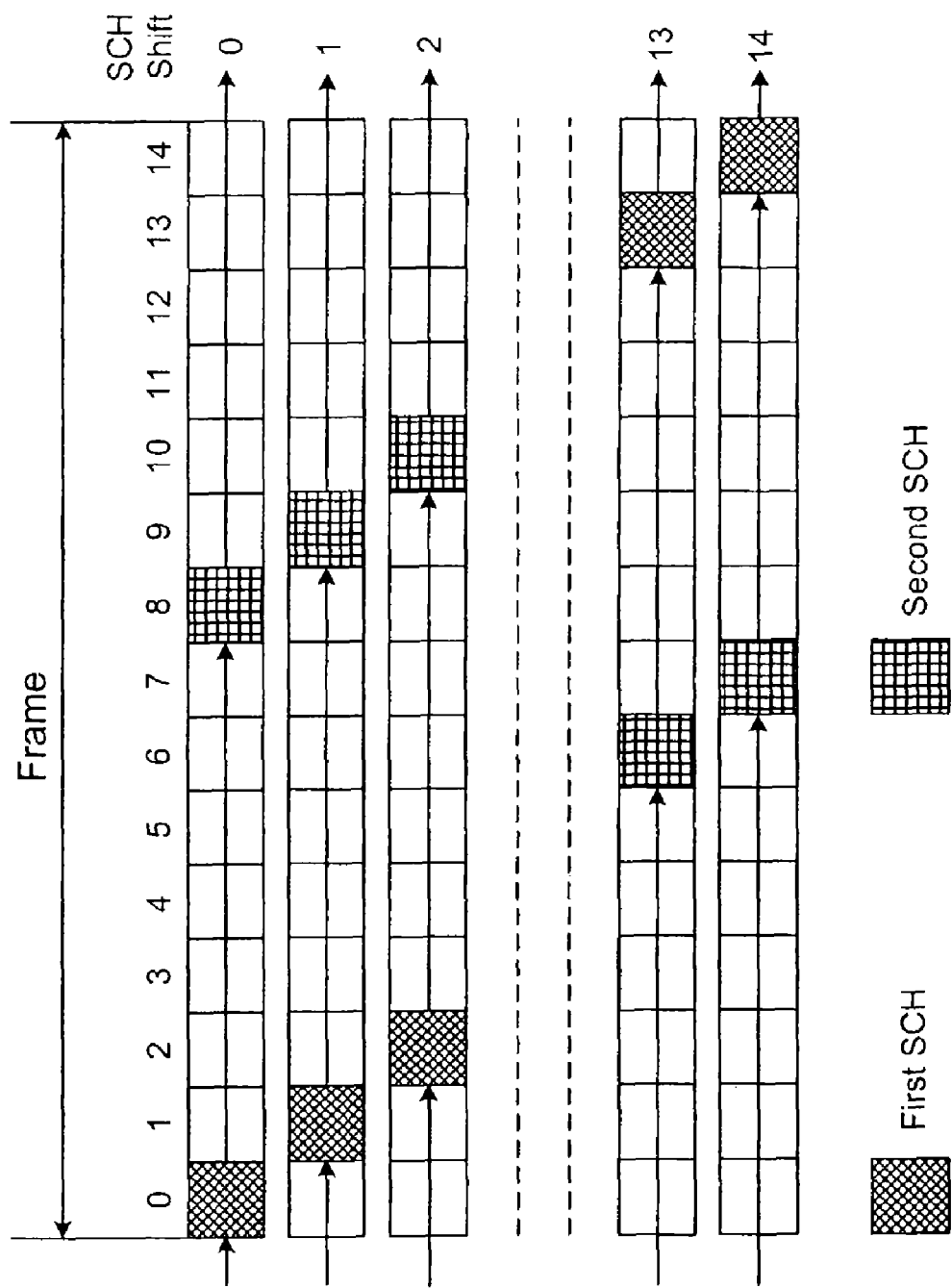
FIG. 2 represents a basic scheduling scheme, according to the prior art solution.

The prior art solution comprises the introduction of 15 different hypotheses (see FIG. 2), each of which assumes the first SCH to be in a particular slot. The second SCH of course will be at a distance of 7 slots. A slot counter is foreseen. In this way it is possible to use the dwelling over the two slots of the first hypothesis. Next the maximum energy value is looked for and it is sent to the Layer 1 (L1) software. Then the second hypothesis is explored in the same way. The same steps are repeated for all other hypotheses. At the end the L1 software has to find the maximum value from the 15 values relative to the 15 different shifted possible SCH. This is the straightforward approach of the prior art solution. The procedure is robust but takes a long time.

Figure 3:
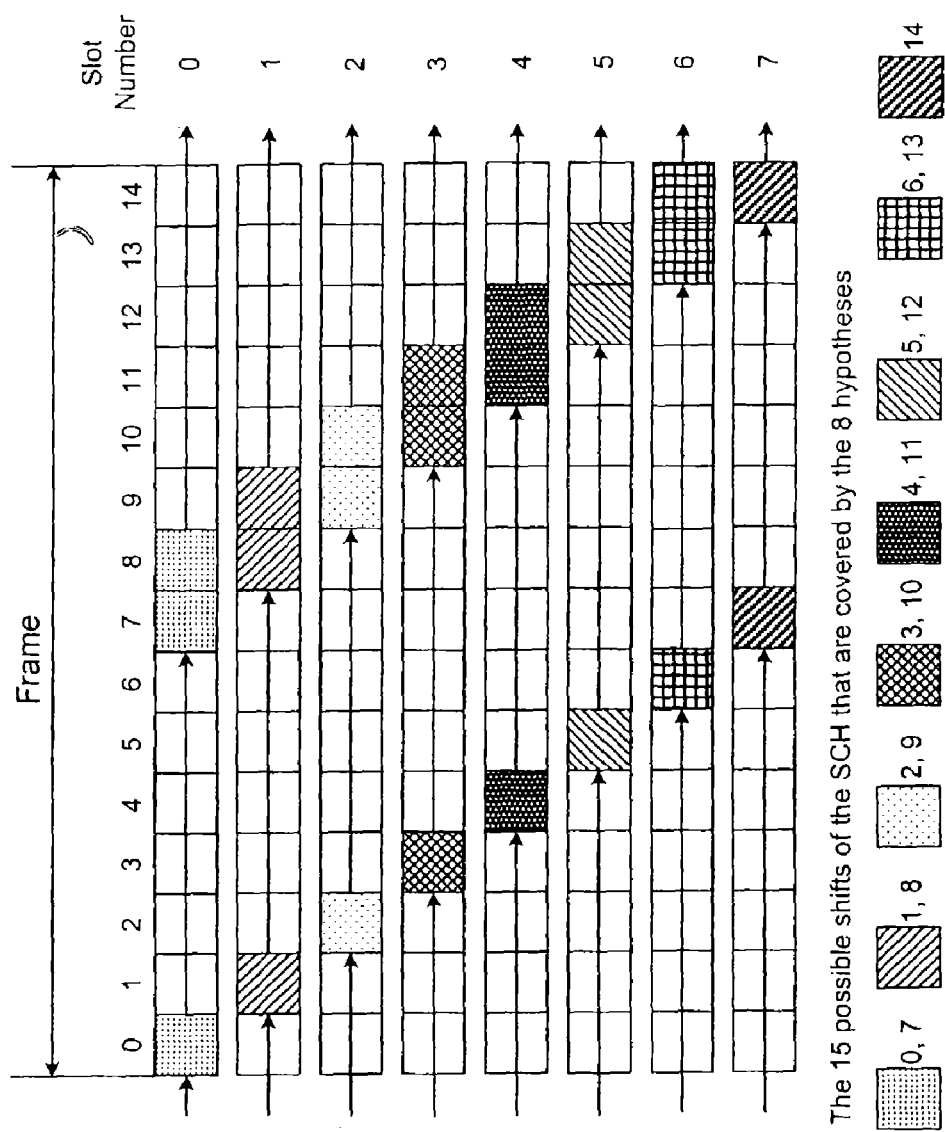
FIG. 3 represents an intermediate scheme.

The scheduling scheme can however cover all 15 possible SCH shifts with only 8 hypotheses. In this case, one hypothesis is made up by supposing the SCH is contained in one particular slot (it can be the first or the second SCH), which further will be called the starting slot, and consequently the following SCH is situated 7 or 8 slots farther. The dwelling procedure will be applied to the starting slot of the present hypothesis and to the two slots a distance of 7 and 8 slots apart. The maximum energy value is looked for after dwelling over three slots (corresponding to one hypothesis) and sent to the Layer 1 (L1) software. Then the RAM is cleared. When the slot counter indicates the arrival of the first slot of the next frame, one starts investigating the next hypothesis. At the end the L1 software has to find the maximum value from the 8 values that have been stored after each hypothesis. So, in this case, it is not necessary to explore all 15 frame slots, but it suffices to check only the first 8 slots after the starting slot, and for sure one of these contains the first or the second SCH. In FIG. 3 all 15 shift possibilities of the SCH are shown. It can also be seen how all 15 possibilities are covered with only 8 combinations, therefore only 8 frames are necessary in order to conclude the procedure. Any non-blank frame slot in the figure is taken into account during some dwelling procedure. Note that in the last hypothesis only two slots are dwelled over.

Figure 4:
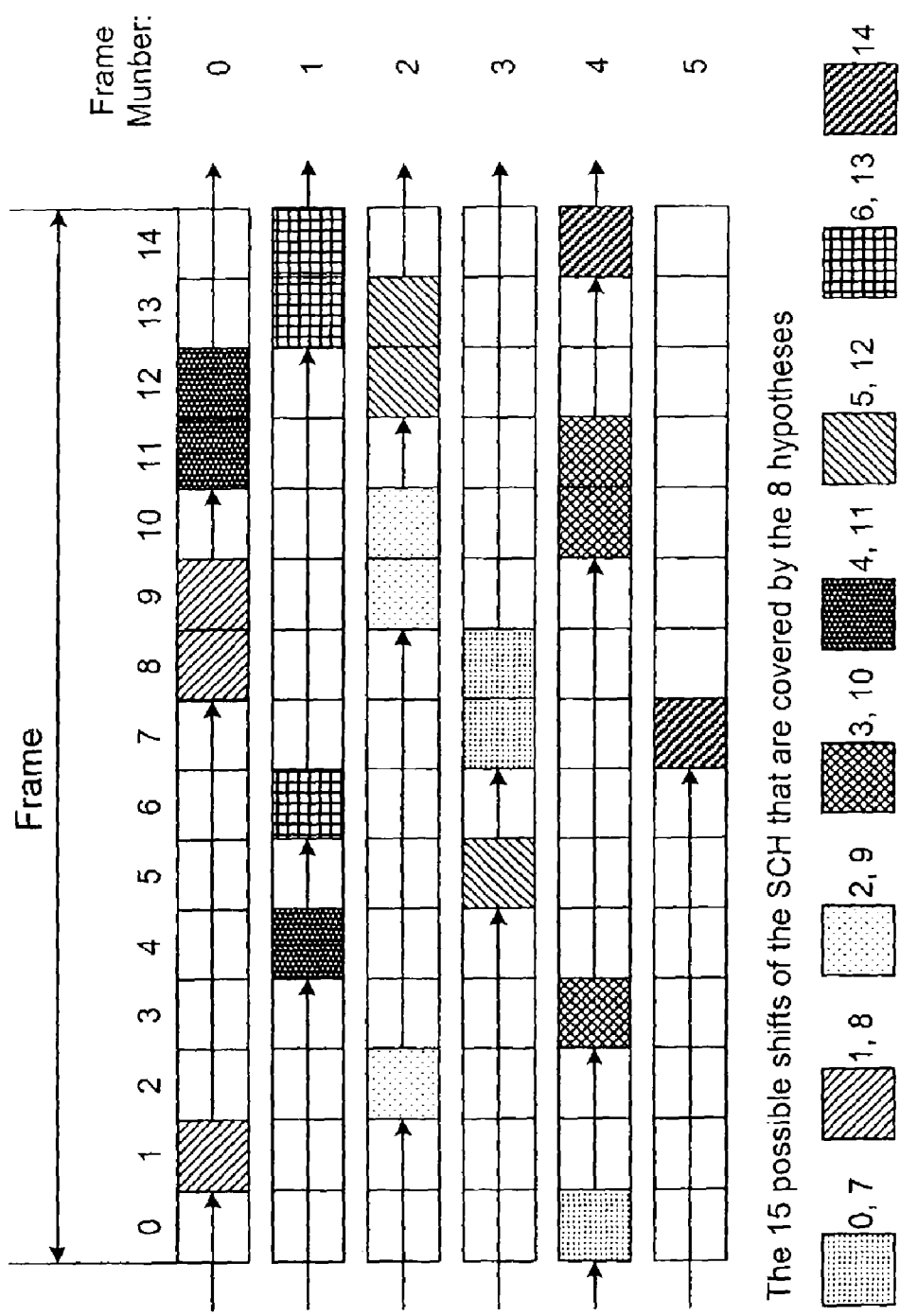
FIG. 4 represents the scheduling scheme according to the invention.

In a further improvement according to the invention the method comprises a particular sequence which even further reduces the number of frames needed in the acquisition procedure—see FIG. 4. It is not important in which slot the dwelling procedure starts, i.e. any hypothesis can be taken as first Again a dwelling procedure is carried out in each non-blank square in FIG. 4. A maximum energy value is calculated and passed to the L1 software after investigating one hypothesis. Then the RAM is cleared and one immediately starts investigating the next hypothesis. At the end of the scheduling scheme a maximum energy value is calculated and passed to the L1 software for the remaining data in the RAM, corresponding to the remaining hypothesis to be investigated. Finally the overall maximum energy value is calculated, indicating the position of the synchronisation slots. In this embodiment of the invention an acquisition time of only 6 frames is needed to explore all possible hypotheses, no matter which hypothesis is started from to construct the scheduling scheme. The scheduling scheme in FIG. 4 started from hypothesis '1' in FIG. 3. This just gives one possible solution. Other schemes can easily be constructed starting from any hypothesis in FIG. 3. From FIG. 4 it can, for example, easily be seen that by starting from hypothesis 7 in FIG. 3, one comes to a solution with hypothesis 7 in the first frame, followed by the first 5 frames as already shown in FIG. 4 (except for the last synchronisation slot of said fifth frame of course, which belongs to the $7^{th}$ hypothesis already used in the beginning of the scheduling scheme). It suffices to keep an unused slot between the end of one hypothesis and the beginning of a following one. During this time the energy peak is searched for, the peak value is sent to the L1 software and the RAM is cleared. In an alternative embodiment of the invention that blank slot between two hypotheses could be omitted, but then another RAM memory is required.

Figure 5:
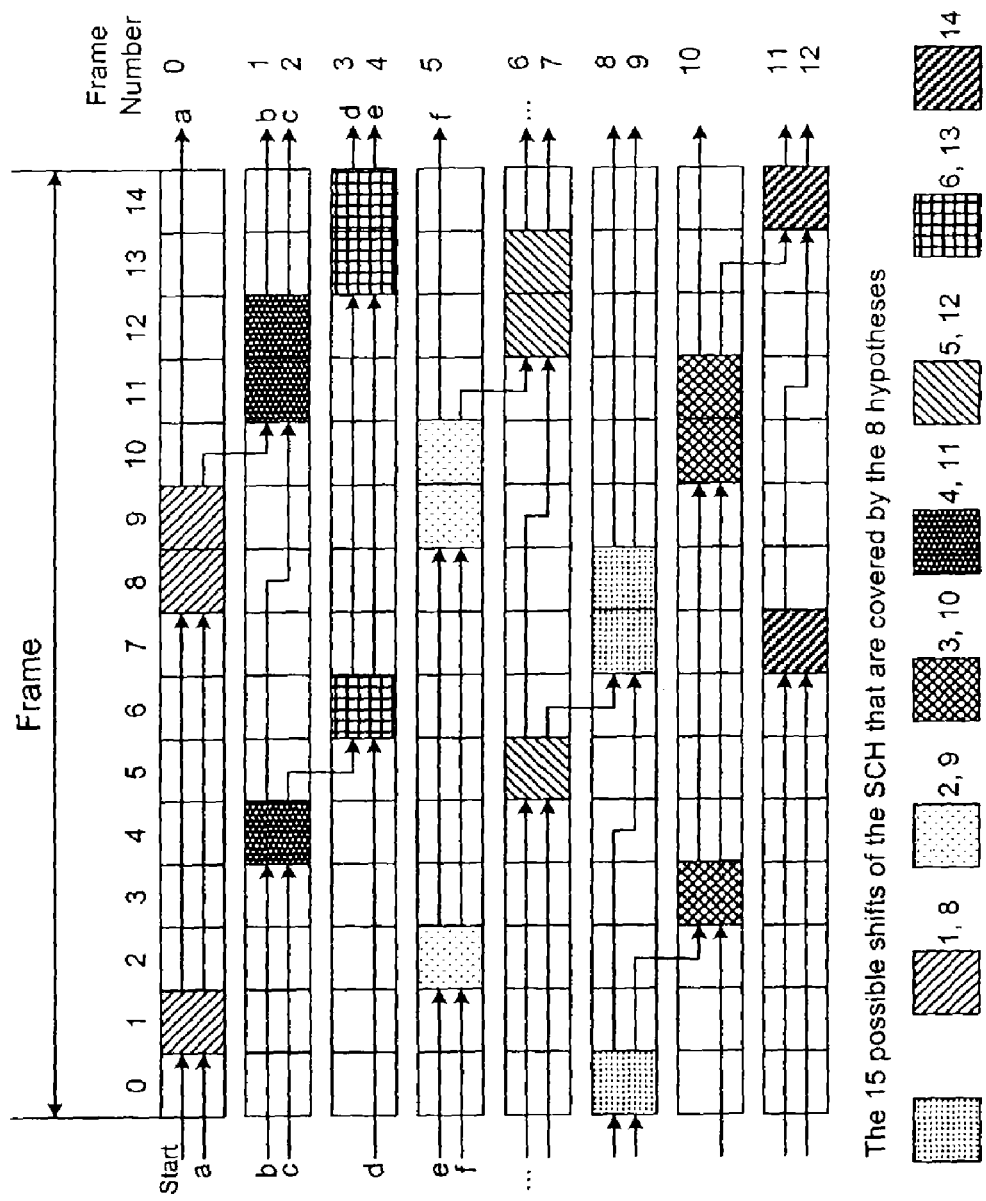
FIG. 5 represents an alternative embodiment of the invention.

In an alternative embodiment of the invention the scheduling scheme in FIG. 5 can be used. The principle applied is the same but one now uses 12 frames to load four times the SCH in the accumulation RAM. Now after two consecutive passes of a particular hypothesis dwelling procedures a maximum energy value is calculated and passed to the L1 software. Then one proceeds to the next hypothesis. The noise will thus be averaged over a larger number of iterations. Again a gap of one slot can be foreseen to clear the RAM at the transition from one hypothesis to the next. The acquisition time now is 13 frames.

In another embodiment of the invention the scheduling scheme of FIG. 4 can be combined with the scheduling scheme as shown in FIG. 5. This can advantageously be done in a strongly noise impaired environment. In that case the correlation peaks may not yet be clearly present after having applied the scheduling scheme in FIG. 4. Therefore the scheme in FIG. 5 will be applied subsequently. As in the latter scheme the SCH is loaded 4 times in the accumulation RAM, the noise will be averaged out. The acquisition time in this scenario is 6+13=19 frames.

Figure 6:
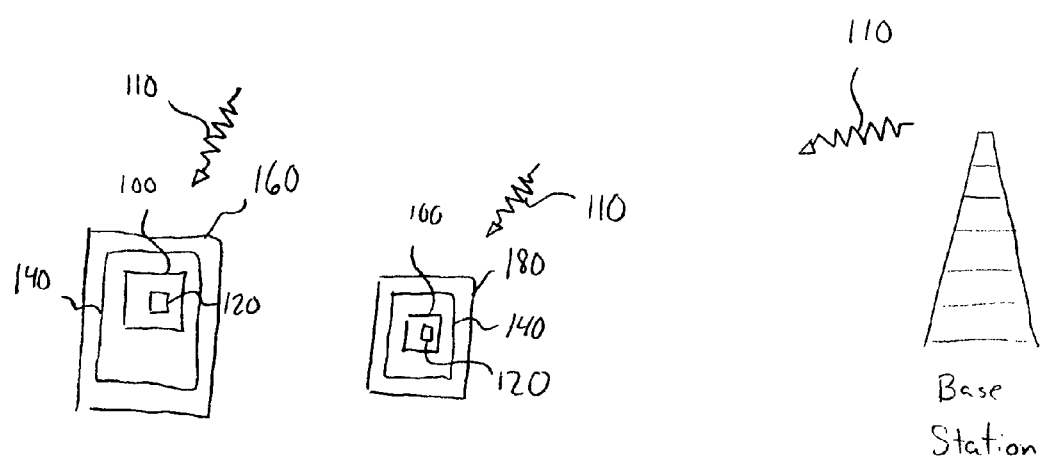
FIG. 6 represents implementation of the invention through use of a module, integrated circuit device, receiver and spread spectrum communication apparatus.

It is clear from this description many more combinations can be envisaged. The more noise is present, the longer the acquisition time will be required. Referring to FIG. 6, the above-described method is implemented using module 100 for the acquisition of burst synchronisation signals 110. The module 100 comprises means for applying the above-described method which is generally represented by reference numeral 120. Preferably, module 100 is comprised in an integrated circuit device 140. Alternatively, a receiver 160 comprises module 100 or integrated circuit device 140 as described above. In yet another embodiment, a spread-spectrum communication apparatus 180 comprises module 100 or integrated circuit device 140.

It is possible make a comparison between the dwelling procedure over all 15 possible shifts (FIG. 2) and the last fast solution (see FIG. 5). The first method takes 15 frames to load two times the SCH in the accumulator RAM (dwelling factor 2), the last solution takes 13 frames to load four times the SCH in the accumulation RAM (with a dwelling factor 4). The latter also loads two times the noise, but this is not relevant: if there is a noise peak, it is highly unlikely to have a noise peak in the same position in another slot. It means a coherent sum will result in an approximately zero average. Therefore, the benefit due to the increased dwelling factor is relatively bigger than the small performance degradation introduced by the noise.

It is important to note this solution reuses all the hardware usually present in the acquisition unit of a FDD W-CDMA system. The main advantages of the invention are Acquisition procedure totally threshold free: to set a threshold is risky as it can be too high or too low More robust dwelling methodology Completely FDD compatible

What is claimed is:

1. A method for the acquisition of burst synchronisation signals in a spread spectrum communication system, comprising the following steps:
  1) Receiving a burst synchronisation signal,
  2) Applying to said received burst synchronisation signal a dwelling procedure according to a scheduling scheme, whereby said dwelling procedure comprises the steps of calculating a matched filter output, summing said outputs over one slot time, calculating the energy in said sum, searching the maximum energy value and passing it to a Random Access Memory,
  3) Based on said scheduling scheme containing a set of X=(N+1)/2 hypotheses, being numbered 0,1, . . . ,X−1 and N being the number of slots in 1 frame, the slots being numbered 0,1, . . . ,N−1, a dwelling procedure being performed in hypothesis n=0, . . . ,X−2 in slots n, n+N−D and n+D and in hypothesis n=X−1 in slots n and n+D, D being the longest distance in slots between two sync slots,
  4) At the end of the scheduling scheme searching for the overall maximum energy value among the energy values stored in said Random Access Memory, whereby said scheduling scheme is built up by
    (a) choosing a first hypothesis from said set of hypotheses,
    (b) performing a dwelling procedure in the frame slots as indicated in the first hypothesis,
    (c) leaving one slot open after the last dwelling procedure for said first hypothesis,
    (d) choosing a second hypothesis not used yet, having in the next available slot a dwelling procedure in that slot and not in the subsequent slot or having in the next available slot a dwelling procedure in that slot as well as in the subsequent,
    (e) performing a dwelling procedure in the frame slots as indicated in the second hypothesis,
    (f) leaving one slot open after the last dwelling procedure for said second hypothesis,
    (g) repeating (d–f) until all hypotheses have been used, whereby in case there is no unused hypothesis that matches, the slot is left empty and the following slot is used.

2. A method for the acquisition of burst synchronisation signals as in claim 1, whereby steps (b) and (e) are repeated.

3. A method for the acquisition of burst synchronisation signals in a spread spectrum communication system, comprising the following steps:
  1) Receiving a burst synchronisation signal,
  2) Applying to said received burst synchronisation signal a dwelling procedure according to a scheduling scheme, whereby said dwelling procedure comprises the steps of calculating a matched filter output, summing said outputs over one slot time, calculating the energy in said sum, searching the maximum energy value and passing it to a Random Access Memory,
  3) Based on said scheduling scheme containing a set of X=(N+1)/2 hypotheses, being numbered 0,1, . . . ,X−1 and N being the number of slots in 1 frame, the slots being numbered 0,1, . . . ,N−1, a dwelling procedure being performed in hypothesis n=0, . . . ,X−2 in slots n, n+N−D and n+D and in hypothesis n=X−1 in slots n and n+D, D being the longest distance in slots between two sync slots,
  4) At the end of the scheduling scheme searching for the overall maximum energy value among the energy values stored in said Random Access Memory, whereby said scheduling scheme is built up by
    (a) choosing a first hypothesis from said set of hypotheses,
    (b) performing a dwelling procedure in the frame slots as indicated in the first hypothesis,
    (c) choosing a second hypothesis not used yet, having in the next available slot a dwelling procedure in that slot and not in the subsequent slot or having in the next available slot a dwelling procedure in that slot as well as in the subsequent,
    (d) performing a dwelling procedure in the frame slots as indicated in the second hypothesis,
    (e) repeating (d–f) until all hypotheses have been used, whereby in case there is no unused hypothesis that matches, the slot is left empty and the following slot is used.

4. A method for the acquisition of burst synchronisation signals according to claim 1, wherein N=15 and D=8.

5. A module for the acquisition of burst synchronisation signals, comprising means for applying a method for the acquisition of burst synchronisation signals in a spread spectrum communication system, comprising the following steps:
  1) receiving a burst synchronisation signal,
  2) applying to said received burst synchronisation signal a dwelling procedure according to a scheduling scheme, whereby said dwelling procedure comprises the steps of calculating a matched filter output, summing said outputs over one slot time, calculating the energy in said sum, searching the maximum energy value and passing it to a Random Access Memory,
  3) based on said scheduling scheme containing a set of X=(N+1)/2 hypotheses, being numbered 0,1, . . . ,X−1 and N being the number of slots in 1 frame, the slots being numbered 0,1, . . . , N−1, a dwelling procedure being performed in hypothesis n=0, . . . , X−2 in slots n, n+N−D and n+D and in hypothesis n=X−1 in slots n and n+D, D being the longest distance in slots between two sync slots, 4) at the end of the scheduling scheme searching for the overall maximum energy value among the energy values stored in said Random Access Memory, whereby said scheduling scheme is built up by:
   (a) choosing a first hypothesis from said set of hypotheses,
   (b) performing a dwelling procedure in the frame slots as indicated in the first hypothesis,
   (c) leaving one slot open after the last dwelling procedure for said first hypothesis,
   (d) choosing a second hypothesis not used yet, having in the next available slot a dwelling procedure in that slot and not in the subsequent slot or having in the next available slot a dwelling procedure in that slot as well as in the subsequent,
   (e) performing a dwelling procedure in the frame slots as indicated in the second hypothesis,
   (f) leaving one slot open after the last dwelling procedure for said second hypothesis,
   (g) repeating (d–f) until all hypotheses have been used, whereby in case there is no unused hypothesis that matches, the slot is left empty and the following slot is used.

6. An integrated circuit device, comprising a module for the acquisition of burst synchronisation signals, comprising means for applying a method for the acquisition of burst synchronisation signals in a spread spectrum communication system, comprising the following steps:
   1) receiving a burst synchronisation signal,
   2) applying to said received burst synchronisation signal a dwelling procedure according to a scheduling scheme, whereby said dwelling procedure comprises the steps of calculating a matched filter output, summing said outputs over one slot time, calculating the energy in said sum, searching the maximum energy value and passing it to a Random Access Memory,
   3) based on said scheduling scheme containing a set of $X=(N+1)/2$ hypotheses, being numbered $0,1,\ldots,X-1$ and N being the number of slots in 1 frame, the slots being numbered $0,1,\ldots,N-1$, a dwelling procedure being performed in hypothesis $n=0,\ldots,X-2$ in slots n, $n+N-D$ and $n+D$ and in hypothesis $n=X-1$ in slots n and $n+D$, D being the longest distance in slots between two sync slots,
   4) at the end of the scheduling scheme searching for the overall maximum energy value among the energy values stored in said Random Access Memory, whereby said scheduling scheme is built up by:
      (a) choosing a first hypothesis from said set of hypotheses,
      (b) performing a dwelling procedure in the frame slots as indicated in the first hypothesis,
      (c) leaving one slot open after the last dwelling procedure for said first hypothesis,
      (d) choosing a second hypothesis not used yet, having in the next available slot a dwelling procedure in that slot and not in the subsequent slot or having in the next available slot a dwelling procedure in that slot as well as in the subsequent,
      (e) performing a dwelling procedure in the frame slots as indicated in the second hypothesis,
      (f) leaving one slot open after the last dwelling procedure for said second hypothesis,
      (g) repeating (d–f) until all hypotheses have been used, whereby in case there is no unused hypothesis that matches, the slot is left empty and the following slot is used.

7. A receiver comprising a module as in claim 5.

8. A spread-spectrum communication apparatus comprising a module as in claim 5.

9. A receiver comprising an integrated circuit device as in claim 6.

10. A spread-spectrum communication apparatus comprising an integrated circuit as in claim 6.

* * * * *